US012757840B2

(12) United States Patent
Frysali et al.

(10) Patent No.: US 12,757,840 B2
(45) Date of Patent: Oct. 13, 2026

(54) FILMS FOR AGRICULTURAL STRUCTURES

(71) Applicant: PLASTIKA KRITIS S.A., Iraklion (GR)

(72) Inventors: Melani A. Frysali, Iraklion Crete (GR); Krystalenia Androulaki, Iraklion Crete (GR)

(73) Assignee: PLASTIKA KRITIS S.A., Iraklion (GR)

(*) Notice: Subject to any disclaimer, the term of this patent is extended or adjusted under 35 U.S.C. 154(b) by 842 days.

(21) Appl. No.: 18/018,123

(22) PCT Filed: Jul. 27, 2021

(86) PCT No.: PCT/GR2021/000050

§ 371 (c)(1),
(2) Date: Jan. 26, 2023

(87) PCT Pub. No.: WO2022/023782

PCT Pub. Date: Feb. 3, 2022

(65) Prior Publication Data

US 2023/0276746 A1 Sep. 7, 2023

(30) Foreign Application Priority Data

Jul. 27, 2020 (EP) .................................... 20386038

(51) Int. Cl.

| | |
|---|---|
| ***A01G 9/14*** | (2006.01) |
| ***B32B 27/08*** | (2006.01) |
| ***B32B 27/16*** | (2006.01) |
| ***B32B 27/18*** | (2006.01) |
| ***B32B 27/30*** | (2006.01) |
| ***B32B 27/32*** | (2006.01) |
| ***C08J 7/04*** | (2020.01) |
| ***C08J 7/048*** | (2020.01) |
| ***C08J 7/18*** | (2006.01) |

(52) U.S. Cl.

CPC ............ *A01G 9/1438* (2013.01); *B32B 27/08* (2013.01); *B32B 27/16* (2013.01); *B32B 27/18* (2013.01); *B32B 27/306* (2013.01); *B32B 27/32* (2013.01); *C08J 7/042* (2013.01); *C08J 7/048* (2020.01); *C08J 7/18* (2013.01); *B32B 2255/10* (2013.01); *B32B 2255/26* (2013.01); *B32B 2307/71* (2013.01); *B32B 2307/7244* (2013.01); *B32B 2307/7246* (2013.01); *B32B 2307/732* (2013.01); *B32B 2410/00* (2013.01); *C08J 2323/04* (2013.01); *C08J 2323/06* (2013.01); *C08J 2427/08* (2013.01); *C08J 2431/04* (2013.01); *Y02A 40/25* (2018.01)

(58) Field of Classification Search

CPC . A01G 9/1438; C08J 7/042; C08J 7/18; C08J 7/048; C08J 2323/06; C08J 2427/08; C08J 2431/04; C08J 2323/04; B32B 27/16; B32B 27/18; B32B 27/306; B32B 27/32; B32B 27/08; B32B 2410/00; B32B 2255/10; B32B 2255/26; B32B 2307/71; B32B 2307/7244; B32B 2307/7246; B32B 2307/732; Y02A 40/25

See application file for complete search history.

(56) References Cited

U.S. PATENT DOCUMENTS

| | | | | |
|---|---|---|---|---|
| 2,160,943 | A | 6/1939 | Britton et al. | |
| 3,057,752 | A | 10/1962 | Covington et al. | |
| 4,868,064 | A | 9/1989 | Grosjean | |
| 6,420,004 | B1 * | 7/2002 | Veyrat | B32B 27/306 428/458 |
| 6,610,377 | B1 | 8/2003 | Forzano et al. | |
| 2008/0090090 | A1 | 4/2008 | Munster et al. | |
| 2010/0189944 | A1 * | 7/2010 | Illsley | B32B 27/306 156/60 |
| 2010/0272936 | A1 | 10/2010 | White et al. | |
| 2012/0295070 | A1 * | 11/2012 | Eggers | B32B 7/12 428/316.6 |
| 2013/0032068 | A1 | 2/2013 | Van Wesenbeeck et al. | |
| 2015/0010358 | A1 | 1/2015 | Van Wesenbeeck et al. | |
| 2017/0360023 | A1 | 12/2017 | Van Wesenbeeck et al. | |
| 2022/0112346 | A1 * | 4/2022 | Cooper | C08J 7/043 |

FOREIGN PATENT DOCUMENTS

| | | | |
|---|---|---|---|
| CN | 1069987 | A | 3/1993 |
| CN | 1685024 | A | 10/2005 |
| CN | 1767946 | A | 5/2006 |
| CN | 101932436 | A | 12/2010 |
| CN | 103538327 | A | 1/2014 |

(Continued)

OTHER PUBLICATIONS

Machine English translation of JP 2551945, Takuro et al., Oct. 27, 1997.*

International standard ISO 15105-2, Plastics—Film and sheeting—Determination of gas-transmission rate, Part 2: Equal-pressure method, First edition, 2003, p. 1-10.

Search Report that issued in corresponding Russian patent Appl. No. 2023102987/10(006440), dated Nov. 29, 2024, along with English translation thereof.

Gibbs et al., "Vinylidene Chloride Monomer and Polymers A Technical Report on VDC and PVDC", Kirk-Othmer: Encyclopedia of Chemical Technology, 4th Ed., vol. 24, Jan. 1, 1997, pp. 882-923.

International Search Report and Written Opinion of the International Searching Authority issued in International Patent Application No. PCT/GR2021/000050, dated Sep. 24, 2021.

(Continued)

*Primary Examiner* — Patrick D Niland

(74) *Attorney, Agent, or Firm* — Greenblum & Bernstein, P.L.C.

(57) ABSTRACT

A film for covering agricultural structures, including: a) a polymeric film having one or more layers, wherein at least one of the layers includes one or more UV stabilisers; and b) a coating on at least one outer surface of the polymeric film, the coating including at least one layer containing a polymer, such that the film has an oxygen permeability below 500 ml/m$^2$/bar/day at 23° C. and 0% relative humidity, as measured according to EN ISO 15105-2.

28 Claims, No Drawings

(56) References Cited

FOREIGN PATENT DOCUMENTS

| | | | |
|---|---|---|---|
| CN | 104602907 | A | 5/2015 |
| CN | 107849387 | A | 3/2018 |
| DE | 4344438 | A1 | 6/1995 |
| EP | 1 857 272 | A1 | 11/2007 |
| EP | 2 065 440 | A1 | 6/2009 |
| EP | 2 746 321 | A1 | 6/2014 |
| JP | 60-250949 | A | 12/1985 |
| JP | 8-224049 | A | 9/1996 |
| JP | 8-244180 | A | 9/1996 |
| JP | 2551945 | B2 * | 11/1996 |
| JP | 10-86295 | A | 4/1998 |
| JP | 2003-259744 | A | 9/2003 |
| JP | 2004-222626 | A | 8/2004 |
| JP | 2017-518205 | A | 7/2017 |
| RU | 2 484 972 | C2 | 6/2013 |
| WO | 96/01736 | A1 | 1/1996 |
| WO | 96/15905 | A1 | 5/1996 |
| WO | 2003/064061 | A1 | 8/2003 |
| WO | 2008/026229 | A1 | 3/2008 |
| WO | 2009/060480 | A1 | 5/2009 |
| WO | 2011/057752 | A2 | 5/2011 |
| WO | 2015/056031 | A1 | 4/2015 |
| WO | 2017/089562 | A1 | 6/2017 |
| WO | 2019-244185 | A1 | 12/2019 |

OTHER PUBLICATIONS

International Preliminary Report on Patentability Authority issued in International Patent Application No. PCT/GR2021/000050, dated Jul. 7, 2022.

English language translation Office Action and Search Report that issued in corresponding Chinese patent. Appl. No. 202180063930.X, dated Mar. 25, 2025.

Florian, “Practical Thermoforming: Principles and Applications”, p. 44, China Petrochemical Press, first edition, Mar. 1992, along with English translation.

Fuxi, “Modern Glass Science and Technology, vol. 2: Special Glass and Processes,” p. 413, Shanghai Scientific and Technical Publishers, first edition, Aug. 1990, along with English translation.

Jang et al., “Oxygen barrier properties of biaxially oriented polypropylene/polyvinyl alcohol blend films”, Polymer 45 (2004), pp. 1599-1607.

* cited by examiner

FILMS FOR AGRICULTURAL STRUCTURES

FIELD OF THE INVENTION

This invention relates to polymeric films for covering agricultural structures and methods of making such films. The invention also relates to the use of a coating on at least one outer surface of a polymeric film as a barrier to gases and water vapour and to reduce the susceptibility of the film to photodegradation in the presence of agrochemicals.

BACKGROUND

Agricultural structures are often covered with flexible films comprising polymeric materials for a variety of purposes. For example, greenhouses may be covered with polymeric films that are tailored to provide a favorable environment for the cultivation of crops and plants. The polymeric films provide protection for the crops grown underneath from adverse weather conditions and create a greenhouse effect by selectively filtering solar radiation.

The polymeric materials of the films, such as polyethylene, ethylene vinyl acetate (EVA) and ethylene butyl acrylate (EBA) copolymers, absorb ultraviolet radiation resulting in photodegradation of the film, thereby reducing the useful lifetime of the film. For this reason, ultraviolet (UV) stabilisers are usually added to the polymeric film material. UV stabilisers function by absorbing UV radiation thereby preventing its absorption by the polymers of the film (UV absorbers) or by interrupting the chemical reactions that lead to photodegradation (free radical scavengers).

Ultraviolet absorbers have two disadvantages that do not allow them to protect the polymer adequately: a) they are usually small molecules which gradually migrate to the surface of the film and are lost to the surroundings; (b) they cannot protect adequately the surface of the film as according to the laws of physics (Lamberts Beer law) they require a certain depth to act as an ultraviolet filter. For this reason, over the last 20 years, the so-called HALS (Hindered Amine Light Stabilizers) have prevailed as the main stabilizers of greenhouse films. HALS are sterically hindered amine compounds which act as free radical scavengers, reacting with the free radicals formed in the polymer under the influence of oxygen, ultraviolet radiation and heat. This stops the chemical reactions that would otherwise lead to chain-scission or cross-linking of the polymer molecules and to a degradation of the physical and optical properties of the film.

HALS have proven to be very effective stabilizers for many applications. However, in the case of greenhouse films there is a serious constraint leading to a reduction of their effectiveness: in the interior of greenhouses, there is wide use of agrochemicals for soil disinfection and plant protection. These agrochemicals decompose under the influence of heat and ultraviolet radiation and create active chemical compounds that enter the film, either in gaseous form or dissolved in water vapor, react with HALS and deactivate them. In particular, sulfur as well as sulfur and chlorine containing compounds can lead to a very significant reduction in the useful lifetime of greenhouse films containing HALS, e.g. from 3-5 years in the Mediterranean to 1-2 years.

In recent years, greenhouse film manufacturers and professional associations (e.g. CEPLA, Spain) have established limits on the sulfur and chlorine content in films that degrade prematurely in order for the manufacturer's lifetime guarantee to be valid. Nevertheless, because the use of pesticides in greenhouses to prevent various crop diseases is unavoidable, and even increasing, the main issue today for improving the quality of polymeric films is to avoid premature ageing due to pesticides.

Various solutions have been proposed to this problem. One proposal is to use a nickel complex as a stabilizer, which is completely resistant to sulfur. However, it is sensitive to chlorine and imparts a yellow color to the film, which is undesirable because it reduces light transmission. Another solution that has been proposed is the use of co-stabilizers that react with the active residues of pesticides and deactivate them, but this has proven insufficient. A further solution is the use of HALS resistant to pesticides such as the NOR HALS. Unfortunately, these specific HALS, although they are more resilient than common HALS, have not solved the problem adequately and premature aging of greenhouse films due to the effect of agrochemicals on UV stabilizers is still observed.

WO2009/060480 and EP1857272 disclose multilayer films comprising a coextruded layer of polyamide. The layer of polyamide may act as a barrier layer to prevent the entry of agrochemicals into the film in gaseous form. Unfortunately, this coextruded layer of polyamide has low elasticity and poor tear propagation strength, which significantly reduces the mechanical strength of the film. The layer of polyamide is also very sensitive to photodegradation, which reduces the lifetime of the film. The polyamide layer also absorbs moisture (up to 9% of its mass) that often contains chemical residues, which are then diffused throughout the mass of the film destroying the stabilizers and/or the polymer itself. When the layer of polyamide absorbs moisture, its permeability to gases also increases to a level where it can no longer prevent the permeation of agrochemicals into the film.

In the case of silage films, it is beneficial for the film to have a low permeability to oxygen to improve the process of anaerobic fermentation and therefore achieve better silage qualify, with fewer losses due to mold.

Multilayer silage films have been proposed, such as those described in U.S. Pat. No. 6,610,377, in which the permeability of oxygen is reduced by using a coextruded layer of polyamide (PA) or ethylene vinyl alcohol (EVOH) in the middle of the film. The disadvantage of these films is that compared to polymeric films without coextruded layers of EVOH and/or PA, they have inferior mechanical properties as discussed above. Particularly affected is the impact resistance (dart test), which is important for this application. In addition, the use of a coextruded layer of EVOH or PA makes it more difficult for these films to be recycled. Moreover, the production of such films requires the use of production machines capable of forming films of at least five layers and the production process is quite demanding, with high scrap level.

In view of the above, there is an unmet need for improved films for covering agricultural structures having a reduced susceptibility to photodegradation in the presence of agrochemicals and good barrier properties to oxygen, while maintaining excellent mechanical properties and recyclability.

DISCLOSURE OF THE INVENTION

According to first aspect of the invention, there is provided a film for covering agricultural structures, comprising:

a) a polymeric film having one or more layers, wherein at least one of the layers comprises one or more UV stabilisers; and b) a coating on at least one outer surface of the polymeric film, the coating comprising at least one layer comprising a polymer, such that the film has an oxygen permeability below 500 ml/$m^2$/bar/day at 23° C. and 0% relative humidity, as measured according to EN ISO 15105-2.

The polymer coating on the surface of the polymeric film provides the film with a low permeability to oxygen and therefore acts as an external gas barrier. As a result, the coating also acts as a barrier to agrochemicals or derivatives thereof in gaseous form, thereby preventing the deactivation of the UV stabilisers in the layers of the film. The films of the invention therefore have improved lifetimes in the presence of agrochemicals, as the polymeric materials of the film are less prone to photodegradation.

The low oxygen permeability of the films of the invention is particularly advantageous for silage films as it promotes anaerobic fermentation thereby achieving a better silage quality with fewer losses due to mold.

As used herein, the term "coating" refers to one or more layers on an outer surface of the polymeric film, wherein each layer is formed by depositing a solution. The at least one layer of the coating comprising the polymer is formed by depositing a solution comprising the polymer. Therefore, the coating forms an external surface of the film and is not a layer within the polymeric film. The coating according to the invention is structurally distinct from a layer of a film produced by coextrusion. Since the coating is formed from a solution, the polymer is in the form of dispersed polymer chains that are deposited to form the coating. In contrast, a coextruded layer is a continuous layer of plastic that has been melted together. Therefore, the coating according to the present invention can be distinguished from a coextruded layer of a film by appropriate techniques. For example, the presence of a coextruded layer in a film can be detected using infrared (IR) spectroscopy. Scanning electron microscopy (SEM) can be used to examine the surface of the film and identify the presence of a coating according to the present invention. EDS (Energy-dispersive X-ray spectroscopy) can be used to determine the elemental composition of the coating and therefore identify the materials present in the coating.

It has surprisingly been found that the use of a barrier coating results in improved mechanical properties compared to a film comprising a coextruded barrier layer. Coextruded barrier layers (for example made from EVOH or polyamide) are rigid and their presence reduces the elasticity and impact strength of the film. The barrier coatings of the invention do not suffer from these drawbacks.

In summary, the use of a barrier coating on the surface of the polymeric film provides a film with low oxygen permeability and reduced permeability to agrochemicals, while maintaining excellent mechanical properties. Furthermore, the films of the invention maintain excellent recyclability.

The inventors have also found that the coating may increase the hydrophilicity of the surface of the polymeric film. This provides the film with anti-dripping properties (i.e. the film inhibits the creation of drops on its surface), which is very desirable for greenhouse covers.

According to another aspect of the invention, there is provided the use of a coating on at least one outer surface of a polymeric film to reduce the susceptibility of the film to photodegradation in the presence of agrochemicals, wherein the coating comprises at least one layer comprising a polymer, and wherein the polymeric film comprises one or more layers, at least one layer comprising one or more UV stabilisers.

According to another aspect of the invention, there is provided the use of a coating on at least one outer surface of a polymeric film to reduce the permeability of the polymeric film to gases and/or water vapour, wherein the coating comprises at least one layer comprising a polymer, and wherein the polymeric film comprises one or more layers, at least one layer comprising one or more UV stabilisers.

According to another aspect of the invention, there is provided an agricultural structure, characterised in that at least a portion thereof is covered with the film of the invention.

According to another aspect of the invention, there is provided a method of covering an agricultural structure, comprising covering at least a portion of the agricultural structure with a film according to the invention.

According to another aspect of the invention, there is provided a method of producing a film for covering agricultural structures, comprising: i) providing a polymeric film comprising one or more layers, wherein at least one of the layers comprises one or more UV stabilisers; and ii) depositing a coating on at least one outer surface of the polymeric film, the coating comprising at least one layer comprising a polymer, such that the film has an oxygen permeability below 500 ml/$m^2$/bar/day at 23° C. and 0% relative humidity, as measured according to EN ISO 15105-2.

According to another aspect of the invention, there is provided a film according to the invention obtainable by the method of producing a film according to the invention.

Polymeric Film

The film of the invention comprises a polymeric film having one or more layers.

The layers of the film may be made from any suitable polymeric materials known to those skilled in the art. The one or more layers of the polymeric film may each independently comprise one or more polymers independently selected from the group consisting of polyesters, polyolefins, polyamides and polyurethanes. For example the one or more layers of the polymeric film may each independently comprise one or more polymers selected from the group consisting of low density polyethylene (LDPE), low density linear polyethylene (LLDPE), metallocene low density linear polyethylene (MLLDPE), ethylene-vinyl acetate copolymer (EVA), ethylene butyl acrylate copolymer (EBA), high density polyethylene (HDPE), polypropylene (PP), thermoplastic polyurethane (TPU), polyethylene terephthalate (PET), polyvinyl chloride (PVC), polyamide (PA), ethylene-vinyl alcohol copolymer (EVOH), and combinations thereof.

At least one layer of the polymeric film comprises one or more UV stabilisers, to provide the film with protection from UV radiation, i.e. preventing photodegradation of the polymeric materials in the film thereby increasing the useful lifetime of the film. UV stabilisers may be present in more than one layer of the polymeric film or all layers of the polymeric film, to provide the desired level of UV protection.

As used herein, "UV stabilisers" includes both "UV absorbers" which absorb ultraviolet radiation and thereby prevent its absorption by the polymers of the polymeric film, and Hindered Amine Light Stabilizers which interrupt the chemical reactions that lead to photodegradation of the polymers.

Any suitable UV stabilisers may be used in the polymeric film. The one or more UV stabilisers may be independently selected from the group consisting of Hindered Amine Light Stabilizers (HALS), UV-absorber, and nickel organic complexes (Ni-quencher).

In a preferred aspect of the invention, at least one of the layers of the polymeric film comprises a Hindered Amine Light Stabilizer (HALS).

Examples of HALS suitable for use in the invention are: 1,3,5-Triazine-2,4,6-triamine, N2,N2"-1,2-ethanediylbis [N2-[3-[[4,6-bis[butyl(1,2,2,6,6-pentamethyl-4-piperidinyl) amino]-1,3,5-triazin-2-yl]amino]propyl]-N',N"-dibutyl-N', N"-bis(1,2,2,6,6-pentamethyl-4-piperidinyl)-butanedioic acid, 1,4-dimethyl ester, polymer with 4-hydroxy-2,2,6,6-tetramethyl-1-piperidineethanol; Poly(4-hydroxy-2,2,6,6-tetramethyl-1-piperidineethanol-alt-1,4-butanedioic acid); and Poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]).

The one or more UV stabilisers can be present in the layers of the film in any suitable amount, for example from 0.1 wt. % to 20 wt. %, preferably from 0.1 wt. % to 10 wt. %, most preferably from 0.1 wt. % to 5 wt. %, based on the total weight of the layer.

The layers of the film may each independently comprise one or more additional components. For example, the one or more layers of the polymeric film may each independently comprise IR absorbers, anti-fogging agents, anti-dripping agents, anti-dust materials, anti-algae materials, adhesive materials, and/or pigments.

The term "IR absorber" as used herein, refers to a substance that absorbs infrared radiation (IR).

As used herein, "anti-dripping agents" refers to substances that prevent the condensation of droplets of water, while "anti-fogging agents" refers to substances that prevent the formation of fog on the surface of the film.

As used herein, "anti-dust materials" refers to substances that repel dust from the surface of the film.

As used herein, "anti-algae materials" refers to substances that inhibit the growth of algae on the film.

As used herein, "adhesive materials," refers to substances that enhances binding of the coating on the film.

Examples of suitable pigments that can be used in the layers of the polymeric film include $TiO_2$ and carbon black. Silage films are typically a different colour on each side, for example black on one side and white on the other. It may be advantageous to have one side being a light colour (such as white) in order to reflect light and avoid overheating.

It is beneficial for greenhouse films to have a high luminous transmittance to provide optimal light conditions inside the greenhouse for the cultivation of crops and plants. For example, the films of the invention may have a luminous transmittance of at least 30%, preferably at least 50%, more preferably at least 75%, most preferably at least 85%.

Further, it may be preferable for greenhouse films to have low haze characteristics, although this depends on geographical location, as higher levels of haze may be desirable in certain areas of the world. Depending on the particular application, the films of the invention may have a haze of from 10% to 90%.

Haze and luminous transmittance can be measured following the ASTM-D1003-92 Standard Test Method for Haze and Luminous Transmittance of Transparent Plastics. This test method covers the evaluation of specific light-transmitting and wide-angle-light-scattering properties of planar sections of materials, such as essentially transparent plastic. A procedure is provided for the measurement of luminous transmittance and haze. Material having a haze value greater than 30% is considered diffusing. In this test method, "haze" is defined as the cloudy or turbid aspect or appearance of an otherwise transparent specimen caused by light scattering from within the specimen or from its surfaces. It is measured as the percent of total transmitted light which, in passing through the specimen, deviates from the incident beam through forward scatter by more than 0.044 rad (2.5°) on average. Luminous transmittance is the ratio of the luminous flux transmitted by a body to the flux incident upon it.

The haze of the film may be measured with a hazemeter. The luminous transmittance can be obtained by placing a clear specimen at a distance from the entrance port of an integrating sphere.

The polymeric film can have any suitable number of layers, such as from 1 to 100 layers, preferably 3 to 11 layers. The film for covering agricultural structures can have any suitable total thickness and total width, such as a total thickness of from 25 μm to 500 μm and a total width of from 1 m to 50 m or from 1 to 60 m.

The polymeric film can be manufactured by any suitable process known to those skilled in the art. Preferably, the polymeric film is obtainable by extrusion or co-extrusion, more preferably blown-film or cast-film extrusion or co-extrusion.

Coating

The film of the invention is provided with a coating on at least one outer surface or side of the polymeric film. The coating comprises at least one layer comprising a polymer.

The coating acts as an external barrier on the polymeric film, inhibiting the transmission of gases, such as oxygen, and water vapour through the film. The coating provides the film with an oxygen permeability below 500 ml/m$^2$/bar/day, preferably below 200 ml/m$^2$/bar/day, more preferably below 100 ml/m$^2$/bar/day, measured according to EN ISO 15105-2 at 23° C. and 0% relative humidity.

The coating is primarily responsible for the low oxygen permeability of the film. Preferably, the polymeric film without the coating has an oxygen permeability above 500 ml/m$^2$/bar/day, more preferably above 1000 ml/m$^2$/bar/day, measured according to EN ISO 15105-2 at 23° C. and 0% relative humidity.

The coating acts as a gas barrier and therefore as a barrier to agrochemicals in gaseous form, preventing them from permeating into the layers of the polymeric film and deactivating the UV stabilisers therein. By preventing the deactivation of the UV stabilisers, the polymeric materials of the film are protected from photodegradation, extending the useful lifetime of the film.

As understood by the skilled person, the term "agrochemicals" refers to chemicals used in agriculture, such as pesticides, insecticides, fumigants, and fertilizers. As used herein, "agrochemicals" also includes by-products produced by the decomposition of the agrochemicals (for example, under the influence of heat and UV radiation) such as sulphur, and sulphur and chlorine containing compounds.

When the films of the invention are used to cover silage, the low oxygen permeability promotes anaerobic fermentation of the silage. This results in a better silage quality with fewer losses due to mold.

By utilising an external barrier coating comprising a polymer, the mechanical properties of the film are not compromised, for example compared to films of the prior art comprising coextruded barrier layers. Coextruded barrier layers (for example made of EVOH or polyamide) are rigid which negatively affects the mechanical properties of the film. When a barrier material such as PA or EVOH is incorporated in the mass of the film as a coextruded layer, such as in the films of the prior art, the mechanical properties of the film are compromised because the flexibility of the coextruded barrier material is lower than the other layers of the film (e.g. polyethylene). As such, the films of the invention have improved mechanical properties, in particular impact resistance, which is particularly beneficial for silage films.

The coating may also provide the film with excellent resistance to abrasion. Further, the coating may also increase the hydrophilicity of the surface of the film. This provides the film with anti-dripping properties (i.e. inhibits the formation of drops on the surface of the film). This is very desirable for greenhouse films in particular, because it prevents water-condensation on the inside surface of the film that can negatively affect plant quality and growth, as the water droplets reduce light-transmission by 15-30% and increase the incidence of certain diseases.

The coating may also provide the film with a low permeability to water vapour, which acts as a barrier to agrochemicals dissolved in water vapour. For example, the film may have a water permeability below 100 $g/m^2/day$, preferably below 50 $g/m^2/day$, most preferably below 10 $g/m^2/day$ at 38° C. and 90% relative humidity, measured according to standard ASTM E96.

The coating described herein may be provided on one or both outer surfaces of the polymeric film. The coatings on each outer surface of the polymeric film can be the same or different. Therefore, each coating may independently be defined as described herein.

Furthermore, the coating may comprise more than one layer as long as at least one layer comprises the polymer. Each layer of the coating can be the same or different. Alternatively, the coating may only comprise a single layer comprising the polymer.

The coating covers substantially all of each outer surface of the polymeric film that is provided with the coating. By "substantially all" it is meant that at least 90% of the outer surface is covered with the coating, preferably at least 95%, more preferably at least 98%, most preferably at least 99%.

Any suitable polymer may be used in the coating to provide the film with low oxygen permeability. In a preferred aspect of the invention, the polymer in the coating is a vinylidene chloride homopolymer or copolymer or a vinyl alcohol homopolymer or copolymer.

As used herein, vinylidene chloride has the following structure:

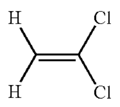

As used herein, the term "homopolymer" refers to a polymer formed essentially from the polymerisation of a single type of monomer or monomer species. Therefore, the term "vinylidene chloride homopolymer" refers to a polymer formed essentially from the polymerisation of only vinylidene chloride monomers. As such, vinylidene chloride homopolymers comprise at least 99 wt. % of the vinylidene chloride monomer, based on the total weight of the homopolymer.

References herein to the amount of the vinylidene chloride monomer in the polymer relate to the units derived from the polymerisation of vinylidene chloride monomers rather than the monomers themselves.

Vinylidene chloride homopolymers have the following repeating unit, where "n" is the number of vinylidene chloride monomer units in the homopolymer:

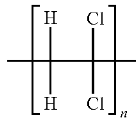

As used herein, the term "copolymer" refers to a polymer formed from the polymerisation of more than one type of monomer. Therefore, the term "vinylidene chloride copolymer" refers to a polymer formed from the polymerisation of vinylidene chloride monomers and one or more other monomers.

The vinylidene chloride copolymer can comprise any suitable amount of the vinylidene chloride monomer, as long as it comprises at least one unit derived from another monomer.

In order to provide optimal barrier properties, it may be beneficial for the vinylidene chloride copolymer to comprise at least 20 wt. % of the vinylidene chloride monomer, preferably at least 40 wt. %, more preferably at least 50 wt. %, more preferably at least 60 wt. %, more preferably at least 70 wt. % most preferably at least 80 wt. %, based on the total weight of the copolymer.

Copolymerising vinylidene chloride with one or more other monomers may be advantageous compared to using the homopolymer of vinylidene chloride. For example, the copolymer may have improved thermal stability. Therefore, in a preferred feature of the invention, the coating comprises a vinylidene chloride copolymer. Preferably, the vinylidene chloride copolymer comprises less than 95 wt. % of the vinylidene chloride monomer, preferably less than 90 wt. %, based on the total weight of the copolymer.

The vinylidene chloride copolymer may comprise from 20 wt. % to 95 wt. % of the vinylidene chloride monomer, preferably from 40 wt. % to 95 wt. %, more preferably from 50 wt. % to 95 wt. %, more preferably from 60 wt. % to 95 wt. %, more preferably from 70 wt. % to 95 wt. %, most preferably from 80 wt. % to 95 wt. %, based on the total weight of the copolymer.

Alternatively, the vinylidene chloride copolymer may comprise from 20 wt. % to 90 wt. % of the vinylidene chloride monomer, preferably from 40 wt. % to 90 wt. %, more preferably from 50 wt. % to 90 wt. %, more preferably from 60 wt. % to 90 wt. %, more preferably from 70 wt. % to 90 wt. %, most preferably from 80 wt. % to 90 wt. %, based on the total weight of the copolymer.

In one preferred aspect of the invention, the vinylidene chloride copolymer comprises at least 50 wt. % of the vinylidene chloride monomer, based on the total weight of the copolymer, preferably from 50 wt. % to 95 wt. %, more preferably from 50 wt. % to 90 wt. %.

As used herein, vinyl alcohol has the following structure:

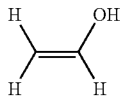

As used herein, the term "vinyl alcohol homopolymer" refers to a polymer formed essentially from the polymerisation of vinyl alcohol monomers. As such, vinyl alcohol homopolymers comprise at least 99 wt. % of the vinyl alcohol monomer, based on the total weight of the homopolymer.

References herein to the amount of the vinyl alcohol monomer in the polymer relate to the units derived from the polymerisation of vinyl alcohol monomers rather than the monomers themselves. As will be appreciated by the skilled person, the polymer may not actually be produced by polymerising vinyl alcohol monomers. Typically, polyvinyl alcohol is produced by polymerising vinyl acetate monomers to form polyvinyl acetate, which is then hydrolysed. Alternatively, acetaldehyde (tautomer of vinyl alcohol) monomers could be used.

Vinyl alcohol homopolymers have the following repeating unit, where "n" is the number of vinyl alcohol monomer units in the homopolymer:

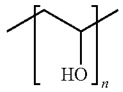

The term "vinyl alcohol copolymer" refers to a polymer formed from the polymerisation of vinyl alcohol monomers and one or more other monomers.

The vinyl alcohol copolymer can comprise any suitable amount of the vinyl alcohol monomer, as long as it comprises at least one unit derived from another monomer.

When hydrolysing polyvinyl acetate to produce polyvinyl alcohol, it may only be partially hydrolysed. Therefore, the vinyl alcohol copolymer may comprise vinyl acetate monomers. Vinyl acetate has the following structure:

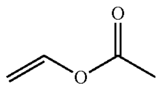

In other words, the vinyl alcohol copolymer may be a copolymer of vinyl alcohol and one or more additional monomers, optionally wherein the one or more additional monomers comprises vinyl acetate.

In order to provide optimal barrier properties, it may be beneficial for the total amount of vinyl alcohol and vinyl acetate monomers in the vinyl alcohol copolymer to be at least 20 wt. %, preferably at least 40 wt. %, more preferably at least 50 wt. %, more preferably at least 60 wt. %, more preferably at least 70 wt. % most preferably at least 80 wt. %, based on the total weight of the copolymer.

Further, it is preferred that the number of vinyl alcohol monomers in the copolymer is at least 80% of the total number of vinyl alcohol and vinyl acetate monomers, preferably at least 95%, most preferably at least 97%. This optimises the barrier properties of the copolymer and increases its stability to humidity.

Of course, vinyl acetate may not be present in the copolymer, in which case the number of vinyl alcohol monomers is 100% of the total number of vinyl alcohol and vinyl acetate monomers and the total amount of vinyl acetate and vinyl alcohol monomers corresponds to the amount of the vinyl alcohol monomer in the copolymer.

Copolymerising vinyl alcohol (and optionally vinyl acetate) with one or more other monomers may be advantageous compared to using only vinyl alcohol and vinyl acetate. For example, the stability of the polymer to humidity may be improved.

Therefore, the total amount of vinyl alcohol and vinyl acetate monomers in the vinyl alcohol copolymer is preferably less than 95 wt. %, preferably less than 90 wt. %, based on the total weight of the copolymer.

The total amount of vinyl alcohol and vinyl acetate monomers in the vinyl alcohol copolymer may be from 20 wt. % to 95 wt. %, preferably from 40 wt. % to 95 wt. %, more preferably from 50 wt. % to 95 wt. %, more preferably from 60 wt. % to 95 wt. %, more preferably from 70 wt. % to 95 wt. %, most preferably from 80 wt. % to 95 wt. %, based on the total weight of the copolymer.

Alternatively, the total amount of vinyl alcohol and vinyl acetate monomers in the vinyl alcohol copolymer may be from 20 wt. % to 90 wt. %, preferably from 40 wt. % to 90 wt. %, more preferably from 50 wt. % to 90 wt. %, more preferably from 60 wt. % to 90 wt. %, more preferably from 70 wt. % to 90 wt. %, most preferably from 80 wt. % to 90 wt. %, based on the total weight of the copolymer.

In one preferred aspect of the invention, the total amount of vinyl alcohol and vinyl acetate monomers in the vinyl alcohol copolymer is at least 50 wt. %, based on the total weight of the copolymer, preferably from 50 wt. % to 95 wt. %, more preferably from 50 wt. % to 90 wt. %.

The vinyl alcohol homopolymer or copolymer may be modified. For example, one or more vinyl alcohol monomers may be modified by carboxylation, etherification, acetalization, carbamation, amination, sulfation, or esterification. In which case, the hydroxyl group may be substituted by another functional group such as carboxyl, ethylene oxide, acetyl, acetoacetyl, sulfonic, amino, or an ammonium salt group.

One or more side chains may also be bonded to vinyl alcohol monomers in the homopolymer or copolymer. Each side chain may be independently selected from polyethylene glycol, polyacrylic acid, polylactic acid, and amylose.

In order to improve its resistance to humidity, the vinyl alcohol homopolymer or copolymer may be cross-linked. The vinyl alcohol homopolymer or copolymer may be cross-linked by heat, UV (ultraviolet radiation), and/or a cross-linking agent.

Any suitable cross-linking agent may be used. For example, the cross-linking agent may be selected from the group consisting of alcohols, straight-chain polyols, branched-chain polyols, aldehydes, amines, polyamines, hydrazides, polyhydrazides, metal salts, acids, and organic acids. Preferably, the cross-linking agent is selected from the group consisting of ethylene glycol, formaldehyde, acetaldehyde, glyoxal, malondialdehyde, succindialdehyde, glutaraldehyde, meta-xylenediamine, 1,3-bis (aminomethyl) cyclohexane, adipic dihydrazide, dodecane dihydrazide, polyol carbonyl adduct, sodium borate, ammonium zirconium carbonate, sodium glyoxylate, malonic acid, succinic acid, adipic acid, boric acid, and sulfosuccinic acid.

Any suitable monomers can be copolymerised with vinylidene chloride, vinyl alcohol, and/or vinyl acetate in the copolymers described herein, such as ethylenically-unsaturated monomers. As used herein, "ethylenically-unsaturated monomer" refers to a monomer comprising a carbon-carbon double bond.

In one preferred feature of the invention, the vinylidene chloride copolymer may be a copolymer of vinylidene chloride and one or more additional monomers and/or the vinyl alcohol copolymer may be a copolymer of vinyl alcohol, one or more additional monomers, and optionally vinyl acetate. The one or more additional monomers may be independently selected from the group consisting of alkenes, acrylates, vinyl halides, vinyl amides, styrenes, vinyl alcohols, vinyl esters, vinyl ethers, vinyl ketones, maleic acid or maleates, fumaric acid or fumarates, itaconic acid or itaconates, crotonic acid or crotonates.

For example, the vinylidene chloride copolymer may be a copolymer of vinylidene chloride and one or more monomers of formula (I). The vinyl alcohol copolymer may be a copolymer of vinyl alcohol, one or more monomers of formula (I), and optionally vinyl acetate:

(I)

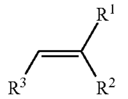

wherein each $R^1$ is independently selected from the group consisting of H, alkyl, $C_3$-$C_{10}$ cycloalkyl, alkoxy, ($C_1$-$C_8$ alkyl)-O—($C_1$-$C_8$ alkyl), $C_6$-$C_{10}$ aryl, $C_1$-$C_9$ heteroaryl, nitrile, —OH, halo, —C(O)$R^4$, —C(O)O$R^4$, —OC(O)$R^4$, —C(O)NH$R^4$, and —NHC(O)$R^4$;

each $R^2$ is independently selected from the group consisting of H, halo, $C_1$-$C_3$ alkyl, —C(O)O$R^5$, and —$CH_2$C(O)O$R^5$;

each $R^3$ is independently selected from the group consisting of H, —C(O)O$R^5$, and $C_1$-$C_3$ alkyl;

each $R^4$ is independently selected from the group consisting of H, $C_1$-$C_{10}$ alkyl, $C_3$-$C_{10}$ cycloalkyl, (01-05 alkyl)-O—($C_1$-05 alkyl), $C_6$-$C_{10}$ aryl, and 01-09 heteroaryl;

each $R^5$ is independently selected from $C_1$-$C_{10}$ alkyl;

wherein each $C_1$-$C_{10}$ alkyl, $C_3$-$C_{10}$ cycloalkyl, $C_1$-$C_{10}$ alkoxy, ($C_1$-$C_8$ alkyl)-O—($C_1$-$C_5$ alkyl), $C_6$-$C_{10}$ aryl and $C_1$-$C_9$ heteroaryl is optionally independently substituted with one or more substituents independently selected from —OH, oxo, —$SO_2$H, —$NO_2$, and halo.

Examples of monomers which can be copolymerised with vinylidene chloride include: ethene, propene, 1-butene, 1-pentene, 1-hexene, 1-heptene, 1-octene, acrylic acid, methyl acrylate, ethyl acrylate, hydroxyethyl acrylate, n-propyl acrylate, isopropyl acrylate, n-butyl acrylate, isobutyl acrylate, tert-butyl acrylate, n-pentyl acrylate, n-hexyl acrylate, cyclohexyl acrylate, n-heptyl acrylate, n-octyl acrylate, 2-ethylhexyl acrylate, phenyl acrylate, methoxyethyl acrylate, chloroethyl acrylate, methacrylic acid, methyl methacrylate, ethyl methacrylate, hydroxyethyl methacrylate, n-propyl methacrylate, isopropyl methacrylate, n-butyl methacrylate, isobutyl methacrylate, tert-butyl methacrylate, n-pentyl methacrylate, n-hexyl methacrylate, cyclohexyl methacrylate, n-heptyl methacrylate, n-octyl methacrylate, 2-ethylhexyl acrylate, phenyl methacrylate, methoxyethyl methacrylate, chloroethyl methacrylate, acrylonitrile, methacrylonitrile, methyl vinyl ketone, phenyl vinyl ketone, methyl vinyl ether, ethyl vinyl ether, divinyl ether, vinyl chloride, vinyl bromide, vinyl alcohol, vinyl acetate, vinyl propionate, vinyl chloroacetate, vinyl naphthalene, styrene, maleic acid, maleic anhydride, fumaric acid, dimethyl maleate, diethyl maleate, dimethyl fumarate, diethyl fumarate, crotonic acid, methyl crotonate, ethyl crotonate, n-propyl crotonate, n-butyl crotonate, itaconic acid, dimethyl itaconate, diethyl itaconate, dibutyl itaconate, acrylamide, methacrylamide, and vinyl pyridine.

Preferably, the vinylidene chloride copolymer is a copolymer of vinylidene chloride and one or more monomers independently selected from the group consisting of ethene, propene, butene, acrylic acid, methyl acrylate, ethyl acrylate, n-propyl acrylate, n-butyl acrylate, hydroxyethyl acrylate, methacrylic acid, methyl methacrylate, ethyl methacrylate, n-propyl methacrylate, n-butyl methacrylate, acrylonitrile, methacrylonitrile, vinyl chloride, styrene, methyl vinyl ketone, vinyl alcohol, vinyl acetate, and itaconic acid.

Examples of monomers which can be copolymerised with vinyl alcohol and optionally vinyl acetate include: ethene, propene, 1-butene, 1-pentene, 1-hexene, 1-heptene, 1-octene, acrylic acid, methyl acrylate, ethyl acrylate, hydroxyethyl acrylate, n-propyl acrylate, isopropyl acrylate, n-butyl acrylate, isobutyl acrylate, tert-butyl acrylate, n-pentyl acrylate, n-hexyl acrylate, cyclohexyl acrylate, n-heptyl acrylate, n-octyl acrylate, 2-ethylhexyl acrylate, phenyl acrylate, methoxyethyl acrylate, chloroethyl acrylate, methacrylic acid, methyl methacrylate, ethyl methacrylate, hydroxyethyl methacrylate, n-propyl methacrylate, isopropyl methacrylate, n-butyl methacrylate, isobutyl methacrylate, tert-butyl methacrylate, n-pentyl methacrylate, n-hexyl methacrylate, cyclohexyl methacrylate, n-heptyl methacrylate, n-octyl methacrylate, 2-ethylhexyl acrylate, phenyl methacrylate, methoxyethyl methacrylate, chloroethyl methacrylate, acrylonitrile, methacrylonitrile, methyl vinyl ketone, phenyl vinyl ketone, methyl vinyl ether, ethyl vinyl ether, divinyl ether, vinyl chloride, vinylidene chloride, vinyl bromide, vinyl propionate, vinyl chloroacetate, vinyl naphthalene, styrene, maleic acid, maleic anhydride, fumaric acid, dimethyl maleate, diethyl maleate, dimethyl fumarate, diethyl fumarate, crotonic acid, methyl crotonate, ethyl crotonate, n-propyl crotonate, n-butyl crotonate, itaconic acid, dimethyl itaconate, diethyl itaconate, dibutyl itaconate, acrylamide, methacrylamide, and vinyl pyridine.

Preferably, the vinyl alcohol copolymer is a copolymer of vinyl alcohol, optionally vinyl acetate, and one or more additional monomers independently selected from the group consisting of ethene, propene, butene, acrylic acid, methyl acrylate, ethyl acrylate, propyl acrylate, butyl acrylate, hydroxyethyl acrylate, methacrylic acid, methyl methacrylate, ethyl methacrylate, propyl methacrylate, butyl methacrylate, acrylonitrile, methacrylonitrile, vinyl chloride, vinylidene chloride, styrene, methyl vinyl ketone, and itaconic acid.

In a preferred embodiment, the vinylidene chloride copolymer may be a copolymer of vinylidene chloride and one or more monomers selected from vinyl chloride, methyl acrylate, methyl methacrylate, hydroxyethyl acrylate, acrylonitrile, methacrylonitrile, vinyl alcohol, and vinyl acetate.

In another preferred embodiment, the vinylidene chloride copolymer may be a copolymer of vinylidene chloride, methyl acrylate, acrylonitrile, and hydroxyethyl acrylate.

In another preferred embodiment, the vinylidene chloride copolymer may be a copolymer of vinylidene chloride, methyl acrylate, and vinyl chloride.

In another preferred embodiment, the vinylidene chloride copolymer may be a copolymer of vinylidene chloride and vinyl chloride.

In another preferred embodiment, the vinylidene chloride copolymer may be a copolymer of vinylidene chloride and methyl acrylate.

In another preferred embodiment, the vinyl alcohol copolymer may be a copolymer of vinyl alcohol, optionally vinyl acetate, and one or more monomers selected from ethene, propene, butene, methyl acrylate, methyl methacrylate, butyl acrylate, hydroxyethyl acrylate, vinyl chloride and vinylidene chloride.

The total thickness of the coating on each outer surface of the polymeric film may independently be from 0.1 μm to 20 μm, preferably from 0.1 μm to 10 μm.

The at least one layer of the coating comprising the polymer may have a thickness of from 0.1 μm to 5 μm, preferably from 0.3 μm to 1.5 μm. Alternatively, the at least one layer of the coating comprising the polymer may have a thickness of from 0.1 μm to 5 μm, more preferably from 0.2 μm to 2.0 μm, most preferably from 0.2 μm to 1.0 μm.

The coating can comprise the polymer in any suitable amount in order to provide the film with low oxygen permeability. When a vinyl alcohol homopolymer or copolymer is used as the polymer, the at least one layer of the coating comprising the polymer may comprise at least 1 wt. % of the polymer, more preferably at least 3 wt. %, more preferably at least 6 wt. %, based on the total dry weight of the at least one layer of the coating comprising the polymer. When a vinylidene chloride homopolymer or copolymer is used as the polymer, the at least one layer of the coating comprising the polymer preferably comprises at least 30 wt. %, of the polymer, more preferably at least 50 wt. %, most preferably at least 70 wt. % based on the total dry weight of the at least one layer of the coating comprising the polymer. By "dry weight" it is meant the weight of the coating once the solvent has been removed.

By depositing a solution of the polymer, it is possible to form a very thin coating on the surface of the polymeric film, which avoids compromising the flexibility and mechanical properties of the polymeric film. Coextruded barrier layers are typically much thicker, which is detrimental to flexibility and the mechanical properties of the film. Furthermore, the weight of the thin barrier coating is negligible compared to the weight of the film as a whole. Therefore, the small amount of coating materials present does not significantly affect the recyclability of the film. Films with thicker coextruded layers (such as EVOH and polyamide) are more difficult to recycle and the recycled material produced from their scraps after the useful life of the film are of poorer quality and lesser commercial value than recycled resins of polyethylene that do not contain such co-extruded layers (e.g. EVOH and polyamide).

In addition to the polymer, each coating may independently comprise one or more additional components.

For example, each coating may independently comprise one or more inorganic particles independently selected from the group consisting of $SiO_2$, $Al_2O_3$, $TiO_2$, $AlCl_3$, MgO, ZnO, CuO, $Fe_2O_3$, clays, and combinations thereof.

Each coating may independently comprise one or more organic molecules independently selected from the group consisting of acrylic resins, epoxy resins, polyurethanes, polyimines, polysiloxanes, surfactants, binders and combinations thereof.

In a preferred aspect of the invention, the vinylidene chloride copolymer comprises at least 50 wt. % of the vinylidene chloride monomer, based on the total weight of the copolymer, and the copolymer is a copolymer of vinylidene chloride and one or more monomers independently selected from the group consisting of alkenes, acrylates, vinyl halides, vinyl amides, styrenes, vinyl esters, vinyl ethers, vinyl ketones, maleic acid or maleates, fumaric acid or fumarates, itaconic acid or itaconates, crotonic acid or crotonates.

In another preferred aspect of the invention, the vinylidene chloride copolymer comprises at least 50 wt. % of the vinylidene chloride monomer, based on the total weight of the copolymer, and the copolymer is a copolymer of vinylidene chloride and one or more monomers independently selected from the group consisting of acrylic acid, methyl acrylate, ethyl acrylate, propyl acrylate, butyl acrylate, hydroxyethyl acrylate, methacrylic acid, methyl methacrylate, ethyl methacrylate, propyl methacrylate, butyl methacrylate, acrylonitrile, methacrylonitrile, vinyl chloride, styrene, methyl vinyl ketone, vinyl acetate, and itaconic acid.

In another preferred aspect of the invention, the vinylidene chloride copolymer comprises at least 50 wt. % of the vinylidene chloride monomer, based on the total weight of the copolymer, and the copolymer is a copolymer of vinylidene chloride and one or more monomers independently selected from the group consisting of vinyl chloride, methyl acrylate, hydroxyethyl acrylate, methyl methacrylate, acrylonitrile, methacrylonitrile, and vinyl acetate.

In another preferred aspect of the invention, the coating comprises a vinylidene chloride copolymer comprising from 50 wt. % to 95 wt. % of the vinylidene chloride monomer, based on the total weight of the copolymer, and the copolymer is a copolymer of vinylidene chloride and one or more monomers independently selected from the group consisting of vinyl chloride, methyl acrylate, hydroxyethyl acrylate, methyl methacrylate, acrylonitrile, methacrylonitrile, and vinyl acetate.

In another preferred aspect of the invention, the one or more UV stabilisers comprises a Hindered Amine Light Stabilizer; and the vinylidene chloride copolymer comprises at least 50 wt. % of the vinylidene chloride monomer, based on the total weight of the copolymer.

In another preferred aspect of the invention, the one or more UV stabilisers comprises a Hindered Amine Light Stabilizer; and the vinylidene chloride copolymer comprises at least 50 wt. % of the vinylidene chloride monomer, based on the total weight of the copolymer, and the copolymer is a copolymer of vinylidene chloride and one or more monomers independently selected from the group consisting of alkenes, acrylates, vinyl halides, vinyl amides, styrenes, vinyl esters, vinyl ethers, vinyl ketones, maleic acid or maleates, fumaric acid or fumarates, itaconic acid or itaconates, crotonic acid or crotonates.

In another preferred aspect of the invention, the one or more UV stabilisers comprises a Hindered Amine Light Stabilizer; and the vinylidene chloride copolymer comprises at least 50 wt. % of the vinylidene chloride monomer, based on the total weight of the copolymer, and the copolymer is a copolymer of vinylidene chloride and one or more monomers independently selected from the group consisting of acrylic acid, methyl acrylate, ethyl acrylate, propyl acrylate, butyl acrylate, hydroxyethyl acrylate, methacrylic acid, methyl methacrylate, ethyl methacrylate, propyl methacrylate, butyl methacrylate, acrylonitrile, methacrylonitrile, vinyl chloride, styrene, methyl vinyl ketone, vinyl acetate, and itaconic acid.

In another preferred aspect of the invention, the one or more UV stabilisers comprises a Hindered Amine Light Stabilizer; and the vinylidene chloride copolymer comprises at least 50 wt. % of the vinylidene chloride monomer, based on the total weight of the copolymer, and the copolymer is a copolymer of vinylidene chloride and one or more monomers independently selected from the group consisting of vinyl chloride, methyl acrylate, hydroxyethyl acrylate, methyl methacrylate, acrylonitrile, methacrylonitrile, and vinyl acetate.

In another preferred aspect of the invention, the one or more UV stabilisers comprises a Hindered Amine Light Stabilizer; and the coating comprises a vinylidene chloride copolymer comprising from 50 wt. % to 95 wt. % of the vinylidene chloride monomer, based on the total weight of the copolymer, and the copolymer is a copolymer of vinylidene chloride and one or more monomers independently selected from the group consisting of vinyl chloride, methyl acrylate, hydroxyethyl acrylate, methyl methacrylate, acrylonitrile, methacrylonitrile, and vinyl acetate.

In another preferred aspect of the invention, the number of vinyl alcohol monomers in the vinyl alcohol copolymer is at least 97% of the total number of vinyl alcohol and vinyl acetate monomers in the copolymer, wherein the vinyl alcohol copolymer is cross-linked with a cross-linking agent independently selected from the group consisting of glyoxal, glutaraldehyde, meta-xylenediamine, 1,3-bis (aminomethyl) cyclohexane, adipic dihydrazide, dodecane dihydrazide, ammonium zirconium carbonate, sodium glyoxylate, boric acid, and sulfosuccinic acid.

In another preferred aspect of the invention, the vinyl alcohol copolymer is a copolymer of vinyl alcohol, one or more monomers selected from ethene and butyl acrylate, and optionally vinyl acrylate, wherein the number of vinyl alcohol monomers in the vinyl alcohol copolymer is at least 97% of the total number of vinyl alcohol and vinyl acetate monomers in the copolymer, and wherein the copolymer is cross-linked with one or more cross-linking agents independently selected from the group consisting of glyoxal, glutaraldehyde, meta-xylenediamine, 1,3-bis (aminomethyl) cyclohexane, adipic dihydrazide, dodecane dihydrazide, ammonium zirconium carbonate, sodium glyoxylate, boric acid, and sulfosuccinic acid.

In another preferred aspect of the invention, the vinyl alcohol copolymer is a copolymer of vinyl alcohol, one or more monomers selected from ethene and butyl acrylate, and optionally vinyl acrylate, wherein the number of vinyl alcohol monomers in the vinyl alcohol copolymer is at least 97% of the total number of vinyl alcohol and vinyl acetate monomers in the copolymer, and wherein the copolymer is cross-linked with one or more cross-linking agents independently selected from the group consisting of glyoxal, glutaraldehyde, meta-xylenediamine, 1,3-bis (aminomethyl) cyclohexane, adipic dihydrazide, dodecane dihydrazide, ammonium zirconium carbonate, sodium glyoxylate, boric acid, and sulfosuccinic acid, and wherein the coating further comprise one or more inorganic particles independently selected from the group consisting of $SiO_2$, $Al_2O_3$, $TiO_2$, $AlCl_3$, MgO, ZnO, CuO, $Fe_2O_3$, clays.

In another preferred aspect of the invention, the number of vinyl alcohol monomers in the vinyl alcohol copolymer is at least 97% of the total number of vinyl alcohol and vinyl acetate monomers in the copolymer, wherein one or more vinyl alcohol monomers in the copolymer has been modified by carboxylation, etherification, acetalization, carbamation, amination, sulfation, or esterification, and wherein the copolymer is cross-linked with one or more cross-linking agents independently selected from the group consisting of glyoxal, glutaraldehyde, meta-xylenediamine, 1,3-bis (aminomethyl) cyclohexane, adipic dihydrazide, dodecane dihydrazide, ammonium zirconium carbonate, sodium glyoxylate, boric acid, and sulfosuccinic acid.

In another preferred aspect of the invention, the number of vinyl alcohol monomers in the vinyl alcohol copolymer is at least 97% of the total number of vinyl alcohol and vinyl acetate monomers in the copolymer, wherein one or more vinyl alcohol monomers in the copolymer has been modified by carboxylation, etherification, acetalization, carbamation, amination, sulfation, or esterification, and wherein the copolymer is cross-linked with one or more cross-linking agents independently selected from the group consisting of glyoxal, glutaraldehyde, meta-xylenediamine, 1,3-bis (aminomethyl) cyclohexane, adipic dihydrazide, dodecane dihydrazide, ammonium zirconium carbonate, sodium glyoxylate, boric acid, and sulfosuccinic acid, and wherein the coating further comprises one or more inorganic particles independently selected from the group consisting of $SiO_2$, $Al_2O_3$, $TiO_2$, $AlCl_3$, MgO, ZnO, CuO, $Fe_2O_3$, and clays.

In another preferred aspect of the invention, the number of vinyl alcohol monomers in the vinyl alcohol copolymer is at least 97% of the total number of vinyl alcohol and vinyl acetate monomers in the copolymer, wherein one or more vinyl alcohol monomers in the copolymer has been modified by carboxylation, etherification, acetalization, carbamation, amination, sulfation, or esterification, and wherein the copolymer is cross-linked with one or more cross-linking agents independently selected from the group consisting of glyoxal, glutaraldehyde, meta-xylenediamine, 1,3-bis (aminomethyl) cyclohexane, adipic dihydrazide, dodecane dihydrazide, ammonium zirconium carbonate, sodium glyoxylate, boric acid, and sulfosuccinic acid, and wherein the coating further comprises one or more organic molecules independently selected from the group consisting of acrylic resins, epoxy resins, polyurethanes, polyimines, polysiloxanes, surfactants, and binders.

Agricultural Structures

The films of the invention are suitable for covering agricultural structures. The term "agricultural structures" as used herein, refers to structures designed for agricultural purposes such as greenhouses, silage pits, silage bunkers, etc.

As such, the invention also includes an agricultural structure, characterised in that at least a portion thereof is covered with a film of the invention. Further, the invention includes a method of covering an agricultural structure, comprising covering at least a portion of the agricultural structure with a film of the invention.

In one embodiment, the film may cover substantially all of the agricultural structure.

For example, the films of the invention may be used to cover a greenhouse. The film may cover the greenhouse such that the "internal" surface (i.e. inside the greenhouse) of the polymeric film has a coating as described herein. The coating therefore protects the layers of the polymeric film from agrochemicals used inside the greenhouse.

The films of the invention may also be used to cover silage. The film may cover the silage such that the "external" surface of the polymeric film (i.e. the surface of the film not in contact with the silage) or the "internal surface" (i.e. the surface of the film in contact with the silage), has a coating as described herein. This coating acts as an external barrier, inhibiting the transmission of oxygen through the film and into contact with the silage.

Method of Producing the Films of the Invention

The films of the invention can be produced by any suitable method known to those skilled in the art.

The films of the invention may be produced by first providing a polymeric film comprising one or more layers, wherein at least one of the layers comprises one or more UV stabilisers, as described herein. Subsequently, either on line during production of the film, or off-line as a separate step, a coating, as described herein, is deposited onto at least one outer surface of the polymeric film, the coating comprising at least one layer comprising a polymer.

The method may comprise producing the polymeric film via blown-film or cast-film extrusion or co-extrusion.

Prior to deposition of the coating, the outer surface of the polymeric film may be treated with corona and/or plasma. This may improve the adhesion of the coating to the outer surface of the polymeric film.

Each layer of the coating is deposited as a solution comprising the components of that layer. The first layer of the coating is deposited onto the surface of the polymeric film. Once the first layer of the coating has dried, the second layer (if present) is deposited on top of the first layer. This process is continued to produce a coating with any number of layers.

The at least one layer of the coating comprising the polymer is deposited as a solution comprising the polymer. Any suitable solvent may be used, such as water. When a vinylidene chloride homopolymer or copolymer is used as the polymer, the solution may comprise from 5% w.w to 90% w.w of the polymer, preferably from 20% w.w to 70% w.w, most preferably from 50% w.w to 60% w.w. When a vinyl alcohol homopolymer or copolymer is used as the polymer, the solution may comprise from 1% w.w to 20% w.w of the polymer, preferably from 2% w.w to 10% w.w, most preferably from 3% w.w to 6% w.w.

The coating may be deposited by any suitable coating technique known to those skilled in the art. Preferably, the coating is deposited via dipping, spraying, flexography, plasma, laser, gravure printing, reverse roll, roll to roll, knife-over-all, rod coater, jet printing, or slot die coating techniques.

Once deposited, the polymeric film may be annealed and rapidly cooled to stabilize the coating.

EXAMPLES

Example 1

A transparent greenhouse film having a thickness of 180 μm and a width of 12 meters was produced on a seven-layer blown film line with an 1800 mm die, at an output of 1300 kg/h and a speed of 11 m/min. The composition of the layers of the film is show in Table 1 below. The film was corona treated and sprayed on one side with a 50% aqueous solution of a copolymer of vinylidene chloride, methyl acrylate, acrylonitrile, and hydroxyethyl acrylate (Diofan 050 from Solvay), to form a coating. The thickness of the coating was 0.8 μm.

TABLE 1

| | |
|---|---|
| Layer 1 | LDPE + MLLDPE + UV |
| Layer 2 | LDPE + MLLDPE + UV |
| Layer 3 | LDPE + LLDPE + UV |
| Layer 4 | LDPE + LLDPE + UV |
| Layer 5 | LDPE + LLDPE + UV |
| Layer 6 | EVA + UV + IR |
| Layer 7 | LDPE + MLLDPE + UV |

LDPE=Low Density Polyethylene; LLDPE=Linear Low Density Polyethylene; MLLDPE=Metallocene Linear Low density Polyethylene; EVA=Ethylene Vinyl Acetate copolymer with 14% Vinyl Acetate content; UV=UV masterbatch containing combinations of UV stabilizers (UV20H containing 20% HALS Chimassorb 944); IR=IR masterbatch containing an infrared absorber.

Example 2

A black/white silage film having a thickness of 100 μm and a width of 12 meters wide was produced on a seven-layer blown film line with an 1800 mm die, at an output of 1300 kg/h and a speed of 19 m/min. The composition of the layers of the film is shown in Table 2 below. The film was corona treated and then immersed in a tank containing a 58% w.w. aqueous solution of a copolymer of vinylidene chloride (Diofan 063 from Solvay), to form a coating of the polymer on one side of the film. The thickness of the coating was 1 μm. Immediately after dipping of the film, it passed through dryers where the water was evaporated, the film was cooled and wrapped in rolls.

TABLE 2

| | |
|---|---|
| Layer 1 | LDPE + MLLDPE + White + UV |
| Layer 2 | LDPE + MLLDPE + White + UV |
| Layer 3 | LDPE + LLDPE + UV |
| Layer 4 | LDPE + LLDPE + UV |
| Layer 5 | LDPE + LLDPE + UV |
| Layer 6 | LDPE + MLLDPE + Black |
| Layer 7 | LDPE + MLLDPE + Black |

White=White masterbatch containing 70% Titanium Dioxide in PE carrier; Black=Black masterbatch containing 40% carbon black in PE carrier. The remaining abbreviations in Table 2 are as defined above for Table 1.

Comparative Example 1

A seven-layer film having a thickness of 180 μm as defined in Table 3 below.

TABLE 3

| | |
|---|---|
| Layer 1 | LDPE + MLLDPE + UV |
| Layer 2 | LDPE + MLLDPE + UV |
| Layer 3 | LDPE + LLDPE + UV |
| Layer 4 | LDPE + LLDPE + UV |
| Layer 5 | LDPE + LLDPE + UV |
| Layer 6 | EVA + UV + IR |
| Layer 7 | LDPE + MLLDPE + UV |

The abbreviations in Table 3 are defined as above.

Comparative Example 2

A seven-layer 100 μm silage film having a 2.5 μm EVOH layer in the middle. The composition of the layers of the film is shown in Table 4 below.

TABLE 4

| | |
|---|---|
| Layer 1 | LDPE + MLLDPE + UV |
| Layer 2 | LDPE + MLLDPE + Green + UV |
| Layer 3 | LDPE + TIE + UV |
| Layer 4 | EVOH 44% |
| Layer 5 | LLDPE + TIE + UV |
| Layer 6 | LDPE + MLLDPE + Silver + UV |
| Layer 7 | LDPE + MLLDPE + UV |

Green=Green masterbatch containing green pigment in PE carrier; Silver=Silver masterbatch, containing aluminum pigment ion PE carrier; EVOH 44%=Ethylene Vinyl Alcohol 44% mol; TIE=tie layer resin. The remaining abbreviations in Table 4 are defined as above.

Permeability to Oxygen

The oxygen permeability of the films for the examples and comparative examples was measured according to standard EN ISO 15105-2 (23° C., 0% RH). The results are shown in Table 5 below.

TABLE 5

| Example | Oxygen Permeability ($cm^3/cm^2/day$) |
|---|---|
| Example 1 | 10 at 1 bar |
| Comparative Example 1 | 900 at 1 bar |
| Example 2 | 15 at 0.2 bar |
| Comparative Example 2 | 14 at 0.2 bar |

The film of Example 1, having a coating comprising a vinylidene chloride copolymer on the surface of the film, has a significantly lower oxygen permeability than Comparative Example 1, without such a coating. This demonstrates that the coating comprising a vinylidene chloride homopolymer or copolymer provides the film with a low oxygen permeability.

Permeability to Agrochemicals

The films of Example 1 and Comparative Example 1 were used to cover two identical metal structures (dimensions of the metal structure: 1850 cm×1100 cm×1000 cm). A sulphur burner, which sublimes sulphur using an infrared lamp, was hung from the middle of the roof of each metal structure (and at distance of 40 cm from it). The sulphur burner was turned on for 30 minutes a day for a total of 3 days. The sulphur burner acts as a source of sulphur inside the metal structure, to simulate agrochemicals decomposing under the influence of heat and UV radiation and creating active compounds, such as sulphur.

Afterwards, film samples were taken from both films at the top of the two structures. The film samples were mechanically rubbed to remove the sulphur from their surface and the sulphur concentrations were then measured using a sulphur analyser from Mitsubishi Chemical.

The results of the sulphur analysis are shown in Table 6 below. As can be seen, the sulphur content of the sample from the film of Example 1 is significantly lower than in the sample of the film from Comparative Example 1. This demonstrates that the oxygen barrier coating on the outer surface of the polymeric film of Example 1 reduces the permeability of the film to sulphur thereby reducing the deactivation of the UV stabilisers in the polymeric film. The films of the present invention thus demonstrate a reduced susceptibility to photodegradation in the presence of agrochemicals.

TABLE 6

| Example | Sulphur content (ppm) |
|---|---|
| Example 1 | 384 |
| Comparative Example 1 | 1398 |

Dart Drop Impact Resistance

The dart drop impact resistance of the films of Example 2 and Comparative Example 2 was measured according to standard EN ISO 77651. The results are shown in Table 7 below.

TABLE 7

| Example | Dart Drop Impact Resistance (gr) |
|---|---|
| Example 2 | 900 |
| Comparative Example 2 | 500 |

The film of Comparative Example 2 comprises a coextruded EVOH barrier layer in the middle of the film. This provides the film with an oxygen permeability of 14 $cm^3/cm^2$/day at 0.2 bar, as referenced above. However, this coextruded barrier layer negatively affects the mechanical properties of the film. For example, the dart drop impact resistance of the film of Comparative Example 2 is only 500 gr.

In contrast, the film of Example 2 has a similarly low oxygen permeability of 15 $cm^3/cm^2$/day at 0.2 bar, but a significantly better dart drop impact resistance of 900 gr. Therefore, the barrier coating of Example 2 provides the film with a low oxygen permeability, but improved mechanical properties compared to the coextruded barrier layer of comparative Example 2.

This demonstrates that the films of the present invention have low permeability to oxygen gas (and therefore a reduced susceptibility to photodegradation in the presence of agrochemicals as demonstrated above by Example 1), while maintaining excellent mechanical properties.

Permeability to Water Vapour

The permeability of the films of Example 1 and Comparative Example 1 to water vapour were measured according to standard ASTM E96 (T=38° C., Δ(RH)=90%). The results are shown in Table 8 below.

TABLE 8

| Example | Permeability to Water Vapour ($g/m^2/day$) |
|---|---|
| Example 1 | 2.4 |
| Comparative Example 1 | 2.4 |

Comparative Example 3

A coextruded film was prepared with the composition as defined in Table 9 below.

TABLE 9

| | |
|---|---|
| Layer 1 | MLLDPE + additives |
| Layer 2 | MLLDPE + additives + tie materials |
| Layer 3 | MLLDPE + 56% polyamide + additives |

The mechanical properties of this film are detailed in Table 10 below.

TABLE 10

| | |
|---|---|
| Strength, machine direction (Mpa) | 21.0 |
| Strength, transverse direction (Mpa) | 16.0 |
| Elongation, machine direction (%) | 408 |
| Elongation, transverse direction (%) | 419 |
| Tear (gf/mic) | 3.4 |
| Dart Drop (gr) | 550 |
| IRT (%) | 6.2 |
| GLT (%) | 84.3 |
| Diff. T. (%) | 70.2 |

IRT = Infrared transmittance; GLT = Global light transmittance; Diff. T. = Diffused transmittance.

It can be seen from Table 10 that the presence of a coextruded layer comprising polyamide in the film results in poor mechanical properties. The films of the present invention having a barrier coating do not suffer from these problems. For example, the film of Comparative Example 3 has a dart drop impact resistance of only 550 gr, whereas the film of Example 2 of the invention has a significantly higher dart drop impact resistance of 900 gr.

Numbered Embodiments of the Invention

Embodiment 1. A film for covering agricultural structures, comprising:

a) a polymeric film having one or more layers, wherein at least one of the layers comprises one or more UV stabilisers; and b) a coating comprising a vinylidene chloride homopolymer or copolymer on at least one outer surface of the polymeric film.

Embodiment 2. A film according to embodiment 1, wherein the coating has a thickness of from 0.1 μm to 5 μm, preferably from 0.3 μm to 1.5 μm.

Embodiment 3. A film according to embodiment 1 or 2, wherein the coating comprises one or more inorganic particles independently selected from the group consisting of $SiO_2$, $Al_2O_3$, $TiO_2$, $AlCl_3$, MgO, ZnO, CuO, $Fe_2O_3$, and combinations thereof; and/or one or more organic molecules independently selected from the group consisting of acrylic resins, epoxy resins, polyurethanes, surfactants, and combinations thereof.

Embodiment 4. A film according to any preceding embodiment, wherein the vinylidene chloride copolymer comprises at least 20 wt. % of the vinylidene chloride monomer, preferably at least 40 wt. %, more preferably at least 50 wt. %, more preferably at least 60 wt. %, more preferably at least 70 wt. % most preferably at least 80 wt. %, based on the total weight of the copolymer; and/or wherein the vinylidene chloride copolymer comprises less than 95 wt. % of the vinylidene chloride monomer, preferably less than 90 wt. %, based on the total weight of the copolymer.

Embodiment 5. A film according to any preceding embodiment, wherein the vinylidene chloride copolymer is a copolymer of vinylidene chloride and one or more monomers of formula (I):

(I)

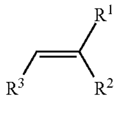

wherein each $R^1$ is independently selected from the group consisting of H, $C_1$-$C_{10}$ alkyl, $C_3$-$C_{10}$ cycloalkyl, $C_1$-$C_{10}$ alkoxy, ($C_1$-$C_5$ alkyl)-O—($C_1$-$C_8$ alkyl), $C_6$-$C_{10}$ aryl, $C_1$-$C_9$ heteroaryl, nitrile, —OH, halo, —C(O)$R^4$, —C(O)O$R^4$, —OC(O)$R^4$, —C(O)NH$R^4$, and —NHC(O)$R^4$;

each $R^2$ is independently selected from the group consisting of H, halo, $C_1$-$C_3$ alkyl, —C(O)O$R^5$, and —$CH_2$C(O)O$R^5$;

each $R^3$ is independently selected from the group consisting of H, —C(O)O$R^5$, and $C_1$-$C_3$ alkyl;

each $R^4$ is independently selected from the group consisting of H, $C_1$-$C_{10}$ alkyl, $C_3$-$C_{10}$ cycloalkyl, ($C_1$-$C_5$ alkyl)-O—($C_1$-$C_5$ alkyl), $C_6$-$C_{10}$ aryl, and $C_1$-$C_9$ heteroaryl;

each $R^5$ is independently selected from $C_1$-$C_{10}$ alkyl;

wherein each $C_1$-$C_{10}$ alkyl, $C_3$-$C_{10}$ cycloalkyl, $C_1$-$C_{10}$ alkoxy, ($C_1$-$C_5$ alkyl)-O—($C_1$-$C_5$ alkyl), $C_6$-$C_{10}$ aryl and $C_1$-$C_9$ heteroaryl is optionally independently substituted with one or more substituents independently selected from —OH, oxo, —$SO_2$H, —$NO_2$, and halo.

Embodiment 6. A film according to any preceding embodiment, wherein the vinylidene chloride copolymer is a copolymer of vinylidene chloride and one or more monomers independently selected from the group consisting of alkenes, acrylates, vinyl halides, vinyl amides, styrenes, vinyl esters, vinyl ethers, vinyl ketones, maleic acid or maleates, fumaric acid or fumarates, itaconic acid or itaconates, crotonic acid or crotonates, preferably wherein the vinylidene chloride copolymer is a copolymer of vinylidene chloride and one or more monomers independently selected from the group consisting of acrylic acid, methyl acrylate, ethyl acrylate, propyl acrylate, butyl acrylate, hydroxyethyl acrylate, methacrylic acid, methyl methacrylate, ethyl methacrylate, propyl methacrylate, butyl methacrylate, acrylonitrile, methacrylonitrile, vinyl chloride, styrene, methyl vinyl ketone, vinyl acetate, and itaconic acid.

Embodiment 7. A film according to any preceding embodiment, comprising a coating on both outer surfaces of the polymeric film, wherein each coating is independently as defined in any of embodiments 1 to 6.

Embodiment 8. A film according to any preceding embodiment, wherein the one or more layers of the polymeric film each independently comprise one or more polymers independently selected from the group consisting of low density polyethylene (LDPE), low density linear polyethylene (LLDPE), ethylene-vinyl acetate copolymer (EVA), ethylene butyl acrylate copolymer (EBA), high density polyethylene (HDPE), polypropylene (PP), thermoplastic polyurethane (TPU), polyethylene terephthalate (PET), polyvinyl chloride (PVC), polyamide (PA), ethylene-vinyl alcohol copolymer (EVOH), and combinations thereof; and/or wherein at least one of the layers of the polymeric film further comprises IR absorbers, anti-fogging agents, anti-dripping agents, anti-dust materials, anti-algae materials, and/or pigments.

Embodiment 9. A film according to any preceding embodiment, wherein the one or more UV stabilisers are independently selected from the group consisting of Hindered Amine Light Stabilizers (HALS), UV-absorbers, and nickel organic complexes; and/or wherein the one or more UV stabilisers are present in an amount of from 0.1 wt. % to 20 wt. %, preferably from 0.1 wt. % to 10 wt. %, most preferably from 0.1 wt. % to 5 wt. %, based on the total weight of the layer.

Embodiment 10.A film according to any preceding embodiment, wherein the polymeric film has from 1 to 100 layers, preferably from 3 to 11 layers; and/or wherein the polymeric film is obtainable by co-extrusion, preferably blown-film or cast-film co-extrusion; and/or wherein the film has a total thickness of from 25 μm to 500 μm and a total width of from 1 m to 50 m; and/or wherein the film has an oxygen permeability below 500 ml/$m^2$/day, preferably below 100 ml/$m^2$/day, measured according to ASTM D3985 at 23° C. and 0% relative humidity.

Embodiment 11. The use of a coating comprising a vinylidene chloride homopolymer or copolymer on at least one outer surface of a polymeric film, wherein the polymeric film comprises one or more layers, at least one layer comprising one or more UV stabilisers, to reduce the susceptibility of the polymeric film to photodegradation in the presence of agrochemicals; and/or to reduce the permeability of the polymeric film to gas and/or water vapour.

Embodiment 12 An agricultural structure, characterised in that at least a portion thereof is covered with a film according to any of embodiments 1 to 10.

Embodiment 13.A method of covering an agricultural structure, comprising covering at least a portion of the agricultural structure with a film according to any of embodiments 1 to 10.

Embodiment 14.A method of producing a film for covering agricultural structures, comprising:

i) providing a polymeric film comprising one or more layers, wherein at least one of the layers comprises one or more UV stabilisers; and ii) depositing a coating comprising a vinylidene chloride homopolymer or copolymer on at least one outer surface of the polymeric film.

Embodiment 15.A method of producing a film according to embodiment 14, wherein the coating is deposited via dipping, spraying, flexography, plasma, laser, gravure printing, reverse roll, roll to roll, knife-over-all, rod coater, jet printing, or slot die; and/or wherein the outer surface of the polymeric film is treated with plasma prior to deposition of the coating; and/or wherein the method further comprises producing the polymeric film via blown or cast co-extrusion.

The invention claimed is:

1. A film for covering agricultural structures, comprising:

a) a polymeric film having one or more layers, wherein at least one of the layers comprises one or more UV stabilisers, and b) a coating on at least one outer surface of the polymeric film, the coating comprising at least one layer comprising a polymer, such that the film has an oxygen permeability below 500 ml/$m^2$/bar/day at 23° C. and 0% relative humidity, as measured according to EN ISO 15105-2, wherein each layer of the coating is formed by depositing a solution to form a layer and drying the layer.

2. The film according to claim 1, wherein the oxygen permeability of the film is below 200 ml/$m^2$/bar/day.

3. The film according to claim 1, wherein the film has a permeability to water vapour below 100 g/$m^2$/day at 38° C. and 90% relative humidity, as measured according to ASTM E96.

4. The film according to claim 1, wherein the at least one layer of the coating comprising the polymer has a thickness of from 0.1 μm to 5 μm.

5. The film according to claim 1, wherein the coating comprises:

one or more inorganic particles independently selected from the group consisting of $SiO_2$, $Al_2O_3$, $TiO_2$, $AlCl_3$, MgO, ZnO, CuO, $Fe_2O_3$, clays, and combinations thereof; and/or one or more organic molecules independently selected from the group consisting of acrylic resins, epoxy resins, polyurethanes, polyimines, polysiloxanes, surfactants, binders and combinations thereof.

6. The film according to claim 1, wherein the polymer in the coating is a vinylidene chloride homopolymer, a vinylidene chloride copolymer, a vinyl alcohol homopolymer, or a vinyl alcohol copolymer.

7. The film according to claim 6, wherein the vinylidene chloride copolymer comprises at least 20 wt. % of the vinylidene chloride monomer based on the total weight of the vinylidene chloride copolymer; and/or wherein the vinylidene chloride copolymer comprises less than 95 wt. % of the vinylidene chloride monomer based on the total weight of the vinylidene chloride copolymer.

8. The film according to claim 6, wherein the vinyl alcohol copolymer is a copolymer of vinyl alcohol and vinyl acetate.

9. The film according to claim 6, wherein the total amount of vinyl alcohol and vinyl acetate monomers in the vinyl alcohol copolymer is at least 20 wt. % based on the total weight of the vinyl alcohol copolymer; and/or wherein the total amount of vinyl alcohol and vinyl acetate monomers in the vinyl alcohol copolymer is less than 95 wt. % based on the total weight of the vinyl alcohol copolymer.

10. The film according to claim 6, wherein the number of vinyl alcohol monomers in the vinyl alcohol copolymer is at least 80% of the total number of vinyl alcohol and vinyl acetate monomers.

11. The film according to claim 6, wherein one or more vinyl alcohol monomers in the vinyl alcohol homopolymer or the vinyl alcohol copolymer has been modified by carboxylation, etherification, acetalization, carbamation, amination, sulfation, or esterification; and/or one or more vinyl alcohol monomers are bonded to side chains of the vinyl alcohol homopolymer or the vinyl alcohol copolymer.

12. The film according to claim 6, wherein the vinyl alcohol homopolymer or the vinyl alcohol copolymer is cross-linked, optionally by a cross-linking agent.

13. The film according to claim 12, wherein the cross-linking agent is selected from the group consisting of alcohols, straight-chain polyols, branched-chain polyols, aldehydes, amines, polyamines, hydrazides, polyhydrazides, metal salts, acids, organic acids, ethylene glycol, formaldehyde, acetaldehyde, glyoxal, malondialdehyde, succindialdehyde, glutaraldehyde, meta-xylenediamine, 1,3-bis (aminomethyl) cyclohexane, adipic dihydrazide, dodecane dihydrazide, polyol carbonyl adduct, sodium borate, ammonium zirconium carbonate, sodium glyoxylate, malonic acid, succinic acid, adipic acid, boric acid, and sulfosuccinic acid.

14. The film according to claim 6, wherein the vinylidene chloride copolymer is a copolymer of vinylidene chloride and one or more monomers of formula (I) and/or the vinyl alcohol copolymer is a copolymer of vinyl alcohol, optionally vinyl acetate, and one or more monomers of formula (I):

(I)

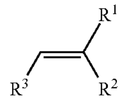

wherein each $R^1$ is independently selected from the group consisting of H, $C_1$-$C_{10}$ alkyl, $C_3$-$C_{10}$ cycloalkyl, $C_1$-$C_{10}$ alkoxy, ($C_1$-$C_5$ alkyl)-O—($C_1$-$C_5$ alkyl), $C_6$-$C_{10}$ aryl, $C_1$-$C_9$ heteroaryl, nitrile, —OH, halo, —C(O)$R^4$, —C(O)O$R^4$, —OC(O)$R^4$, —C(O)NH$R^4$, and —NHC(O)$R^4$;

each $R^2$ is independently selected from the group consisting of H, halo, $C_1$-$C_3$ alkyl, —C(O)O$R^5$, and —$CH_2$C(O)O$R^5$;

each $R^3$ is independently selected from the group consisting of H, —C(O)$OR^5$, and $C_1$-$C_3$ alkyl;

each $R^4$ is independently selected from the group consisting of H, $C_1$-$C_{10}$ alkyl, $C_3$-$C_{10}$ cycloalkyl, ($C_1$-$C_5$ alkyl)-O—($C_1$-$C_5$ alkyl), $C_6$-$C_{10}$ aryl, and $C_1$-$C_9$ heteroaryl; and each $R^5$ is independently selected from $C_1$-$C_{10}$ alkyl;

wherein each $C_1$-$C_{10}$ alkyl, $C_3$-$C_{10}$ cycloalkyl, $C_1$-$C_{10}$ alkoxy, ($C_1$-$C_5$ alkyl)-O—($C_1$-$C_5$ alkyl), $C_6$-$C_{10}$ aryl and $C_1$-$C_9$ heteroaryl is optionally independently substituted with one or more substituents independently selected from —OH, oxo, —$SO_2H$, —$NO_2$, and halo.

15. The film according to claim 6, wherein the vinylidene chloride copolymer is a copolymer of vinylidene chloride and one or more additional monomers and/or the vinyl alcohol copolymer is a copolymer of vinyl alcohol, optionally vinyl acetate, and one or more additional monomers, wherein the one or more additional monomers are independently selected from the group consisting of alkenes, acrylates, vinyl halides, vinyl amides, styrenes, vinyl alcohols, vinyl esters, vinyl ethers, vinyl ketones, maleic acid, maleates, fumaric acid, fumarates, itaconic acid, itaconates, crotonic acid and crotonates.

16. The film according to claim 6, wherein the vinylidene chloride copolymer is a copolymer of vinylidene chloride and one or more additional monomers independently selected from the group consisting of ethene, propene, butene, acrylic acid, methyl acrylate, ethyl acrylate, propyl acrylate, butyl acrylate, hydroxyethyl acrylate, methacrylic acid, methyl methacrylate, ethyl methacrylate, propyl methacrylate, butyl methacrylate, acrylonitrile, methacrylonitrile, vinyl chloride, styrene, methyl vinyl ketone, vinyl alcohol, vinyl acetate, and itaconic acid.

17. The film according to claim 6, wherein the vinyl alcohol copolymer is a copolymer of vinyl alcohol, optionally vinyl acetate, and one or more additional monomers independently selected from the group consisting of ethene, propene, butene, acrylic acid, methyl acrylate, ethyl acrylate, propyl acrylate, butyl acrylate, hydroxyethyl acrylate, methacrylic acid, methyl methacrylate, ethyl methacrylate, propyl methacrylate, butyl methacrylate, acrylonitrile, methacrylonitrile, vinyl chloride, vinylidene chloride, styrene, methyl vinyl ketone, and itaconic acid.

18. The film according to claim 1, wherein the coating comprises a vinylidene chloride homopolymer or a vinylidene chloride copolymer.

19. The film according to claim 1, wherein the coating comprises more than one layer, and at least one layer of the coating comprises the polymer.

20. The film according to claim 1, wherein the coating comprises a single layer comprising the polymer.

21. The film according to claim 1, comprising a coating on both outer surfaces of the polymeric film, wherein each coating comprises at least one layer comprising a polymer, such that the film has an oxygen permeability below 500 ml/$m^2$/bar/day at 23° C. and 0% relative humidity, as measured according to EN ISO 15105-2;

wherein each layer of the coating is formed by depositing a solution to form a layer and drying the layer.

22. The film according to claim 1, wherein the one or more layers of the polymeric film each independently comprise one or more polymers independently selected from the group consisting of low density polyethylene (LDPE), low density linear polyethylene (LLDPE), metallocene low density linear polyethylene (MLLDPE), ethylene-vinyl acetate copolymer (EVA), ethylene butyl acrylate copolymer (EBA), high density polyethylene (HDPE), polypropylene (PP), thermoplastic polyurethane (TPU), polyethylene terephthalate (PET), polyvinyl chloride (PVC), polyamide (PA), ethylene-vinyl alcohol copolymer (EVOH), and combinations thereof; and/or wherein at least one of the layers of the polymeric film further comprises IR absorbers, anti-fogging agents, anti-dripping agents, anti-dust materials, anti-algae materials, adhesion assistant materials, and/or pigments.

23. The film according to claim 1, wherein the one or more UV stabilisers are independently selected from the group consisting of Hindered Amine Light Stabilizers (HALS), UV-absorbers, and nickel organic complexes; and/or wherein the one or more UV stabilisers are present in an amount of from 0.1 wt. % to 20 wt. % based on the total weight of the layer.

24. The film according to claim 1, wherein the polymeric film has from 1 to 100 layers; and/or wherein the polymeric film is obtained by extrusion or co-extrusion; and/or wherein the film has a total thickness of from 25 μm to 500 μm and a total width of from 1 m to 60 m.

25. An agricultural structure, wherein at least a portion of the agricultural structure is covered with the film according to claim 1.

26. A method of covering an agricultural structure, comprising covering at least a portion of the agricultural structure with the film according to claim 1.

27. A method of producing a film for covering agricultural structures, comprising:

i) providing a polymeric film comprising one or more layers, wherein at least one of the layers comprises one or more UV stabilisers; and ii) depositing a coating on at least one outer surface of the polymeric film, the coating comprising at least one layer comprising a polymer, such that the film has an oxygen permeability below 500 ml/$m^2$/bar/day at 23° C. and 0% relative humidity, as measured according to EN ISO 15105-2, wherein each layer of the coating is formed by depositing a solution to form a layer and drying the layer.

28. The method of producing a film according to claim 27, wherein the coating is deposited via dipping, spraying, flexography, plasma, laser, gravure printing, reverse roll, roll to roll, knife-over-all, rod coater, jet printing, or slot die; and/or wherein the outer surface of the polymeric film is treated with corona and/or plasma prior to deposition of the coating; and/or wherein the method further comprises producing the polymeric film via blown or cast extrusion or co-extrusion.

* * * * *